UNITED STATES PATENT OFFICE.

WILLIAM BEACH PRATT, OF WELLESLEY, MASSACHUSETTS, ASSIGNOR TO E. H. CLAPP RUBBER COMPANY, OF BOSTON, MASSACHUSETTS, A CORPORATION OF MASSACHUSETTS.

EBONITE SOLUTION.

1,409,570. Specification of Letters Patent. Patented Mar. 14, 1922.

No Drawing. Application filed May 11, 1918. Serial No. 233,855.

*To all whom it may concern:*

Be it known that I, WILLIAM BEACH PRATT, a citizen of the United States, residing at Wellesley, in the county of Norfolk and State of Massachusetts, have invented new and useful Improvements in Ebonite Solutions, of which the following is a specification.

This invention consists of an ebonite solution, a solvent of ebonite and a process of making it.

So far as I am aware, it has heretofore been regarded as impossible to produce a solution of ebonite (or hard vulcanized rubber), but I have discovered that such bodies can be successfully dissolved, to form a liquid or a semi-solid mass, by products resulting from the acid treatment of terpene-containing materials.

In my co-pending application, Serial No. 229,925, filed on the 22nd day of April, 1918, I have described in detail a process by which such terpene-containing substances may be caused to yield, among others, products that are marked by their capacity to dissolve ebonite. According to that process, certain substances containing terpenes, such as oil or spirits of turpentine or its equivalent, is thoroughly mixed with commercial hydrated crystalline oxalic acid (say 2.5%–10% by weight), and the mixture is digested at atmospheric pressure, or above, at a temperature of approximately 140°–163° C.; after which the mixture is allowed to cool until the oxalic acid is crystallized out, whereupon the product and the acid are separated, and the product is preferably washed to remove effectively all acid therefrom. On subjecting this product to fractional distillation to remove those oils having a boiling point less than 202° C., a heavy oil residuum remains, which I have discovered is a solvent of ebonite (and, of course, vulcanized hard rubber). This residuum, on further fractional distillation, yields from 202°–255° C. heavy distillates consisting of mixtures of heavy oils analogous to those of the eucalyptus and camphor series, and a heavy residuum which solidifies on cooling to ordinary temperatures. Each of these last-mentioned products, to wit, the heavy distillates boiling at 202°–255° C. and the residuum, dissolve vulcanized hard rubber and ebonite. The residuum has the most intensive solvent properties, and, when melted, apparently dissolves twice its weight of ebonite.

As a practical matter, it is unnecessary to subject to further fractional distillation the residue left after distilling off those oils which boil at a temperature less than 202° C., as it may be used for forming the ebonite solution, the viscosity of the solution depending upon the proportions in which the ebonite and the solvent are mixed.

An ebonite solution may be produced by stirring and digesting fine particles of ebonite (obtained by grinding or pulverizing the ebonite mass) with the solvent at an elevated temperature,—say approximately 200° C.,—the proportions of ebonite and solvent varying with the desired concentration or viscosity of the solution. By employing equal parts, by weight, of the solvent and the finely comminuted ebonite, a sticky semi-solid or pasty mass (when cooled) is produced. On exposure to heat at a vulcanizing temperature,—say 140° to 200° C.,—the solution sets to the rigidity possessed by the original ebonite.

In making the solution and during the digestion, the fine particles of ebonite at first are held in suspension, then there is a noticeable swelling of the particles, and then the original color of the comminuted ebonite, which persists while they are swelling, changes, and the whole mixture becomes resolved into a brilliant black homogeneous mass, which is the end product.

Any mineral or other fillers added to the ebonite (or hard rubber) in the course of its manufacture may be filtered out of the solution, or removed therefrom in any suitable manner, although, as a practical matter, the presence of small quantities of these bodies in suspension in the solution is not detrimental to its use for many purposes. A liquid ebonite solution, prepared as herein described, when diluted filters through parchment.

The lower-boiling-point distillates, yielded by the fractional distillation of the oxalic-acid-treated spirits of turpentine, e. g. those having boiling points of 130°–156° C., or 174°–178° C., appear not to dissolve ebonite or vulcanized hard rubber, when used alone, but may be employed as "thinners" of the heavy products boiling at 202° C. and above.

It is possible, although I do not now regard it as especially commercially desirable, to use, in dissolving ebonite, the product directly resulting from the described treatment of spirits of turpentine without subjecting it to fractional distillation, since as the lighter volatile oils, having a fraction of 178° C. and below, appear per se not to have the property of dissolving ebonite, they are wasted by volatilization in forming the solution, and are useful, so far as I have yet been able satisfactorily to determine, only in thinning or diluting the heavy oil solvents, although it is possible or perhaps probable that certain of the light oils, e. g. especially those boiling at 174°–178° C., when mixed with the heavy oil residuum, may have a certain solvent action on the residuum or on the ebonite itself.

Any other suitable terpene-containing material may be employed in lieu of oil or spirits of turpentine, and is intended to be included by the term "spirits of turpentine" as employed in the following claims; and, likewise, in referring to "ebonite," I mean of course to include vulcanized hard rubber.

An ebonite solution, as herein described, may be used as a dip for various articles to be covered, protected or insulated, or it may be spread thereon by a blade, brush or spraying nozzle, according to its consistency or viscosity. The articles are then preferably heated to an elevated temperature comparable with vulcanization to drive off the solvent, so as to leave a coating of ebonite thereon. Such a coating is hard, resilient, glossy black, capable of taking a high polish, and possesses all of the original characteristics of ebonite.

What I claim is:

1. An ebonite solution capable of passing through parchment.

2. A solution of ebonite in a product obtained by digesting spirits of turpentine with oxalic acid.

3. A solution of ebonite in a product obtained by digesting spirits of turpentine with oxalic acid and distilling off the light oils thereof.

4. A solution of ebonite in a residuum resulting from the fractional distillation of that product obtained by digesting spirits of turpentine in the presence of oxalic acid.

5. A solution of ebonite in a residuum resulting from the distillation from oxalic-acid treated spirits of turpentine of those oils having a boiling point of less than 202° C.

6. A solution of ebonite in a residuum resulting from the distillation of those oils, having boiling points of less than 202° C., from spirits of turpentine previously digested with oxalic acid at a temperature of not less than 140° C.

7. A process of making an ebonite solution which consists in digesting comminuted ebonite at a temperature of not less than 140° C. with a compound obtained by digesting spirits of turpentine with oxalic acid.

8. A process of making an ebonite solution which consists in digesting particles of ebonite at a temperature of not less than 140° C. with a residuum resulting from distilling off the light oils of spirits of turpentine previously digested with oxalic acid.

In testimony whereof I have affixed my signature.

WILLIAM BEACH PRATT.